Sept. 15, 1959 W. ALTROGGE ET AL 2,904,723
IGNITION CONTRIVANCE FOR COMBUSTION ENGINES
Filed Oct. 26, 1955
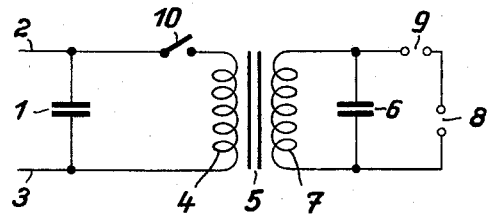
Inventors:
WILHELM ALTROGGE
KURT WILLUTZKY
FRANK FRÜNGEL
By William H. Kumer 2,904,723
Patented Sept. 15, 1959

2,904,723

IGNITION CONTRIVANCE FOR COMBUSTION ENGINES

Wilhelm Altrogge and Kurt Willutzky, Hamburg-Othmarschen, and Frank Früngel, Hamburg-Rissen, Germany; said Willutzky and said Früngel, assignors to said Altrogge Application October 26, 1955, Serial No. 542,962

Claims priority, application Germany October 30, 1954

5 Claims. (Cl. 315—186)

The invention concerns an ignition contrivance for combustion engines comprising a capacitor at the low-tension side to receive the energy provided for the ignition and a transformer between said capacitor and the spark gap.

The known ignition contrivances show the disadvantage, that no sufficient high momentary power is present at the spark gap to guarantee with certainty an ignition under more difficult conditions. For instance it is the custom to cause the ignition by a sudden breakdown of an electro-magnetic field within a high-ohmic winding and by the high-tension shock resulting thereof. Frequently provision is made to obtain an oscillating ignition cycle, so that the ignition occurs in form of a longer discharge or of several sparks. The appearing high-tension shock is proportioned in such a manner, that the spark gap of the spark plug breaks down, when reaching the breakdown tension given by the pre-compression and the distance between the electrodes. For the ignition a longer supply of heat to the gas-mixture has sense principally only as long as the combustion heat of the expanding burning gas volume does not lie within the range of the momentary power present at the spark plug.

The ignition contrivances generally in use are, with regard to the spark plug insulators, constructed such that the latter keeps its so-called self-cleaning temperature. Since there is only a comparatively small temperature interval between the beginning of this self-cleaning and the occuring of the glow-ignition it is almost impossible to operate for instance an Otto-motor with its known ignition-contrivance when the operating conditions deviate from normal conditions.

Solutions have been already proposed, in which a momentary discharge of the ignition-energy has to take place, to produce a short, but very intensive ignition spark. With the known solutions using an inductive storage the discharge circuit has to contain a high ohmic-resistance and also a high self-induction, both of which limit in an undesired way the maximum power of the momentary discharge. Though it is known to shunt the spark plug with a capacitor, also these solutions could not improve essentially the efficiency of the known ignition arrangements because the only installation of a supplementary capacitor at the spark gap is of minor importance.

The object of this invention is to provide an ignition contrivance of simple construction, producing an ignition spark of considerably high intensity in consequence of an extraordinarily speedy turnover of a necessary quantity of electric energy within a low-inductive circuit. Hereby not only the ignition effects compared with those of the known constructions will be considerably improved, but this also results in an effective arrangement which guarantees a reliable operation because of its simple structure of elements not liable to disturbances and which requires very little attendance.

According to the invention the ignition contrivance comprises preferably three, or eventually even more, inductive or galvanic coupled circuits the natural frequency of which increases in the direction of the ignition spark gap. In the first circuit a medium or low-tension capacitor is provided, and in the last circuit, immediately in parallel to the ignition spark gap, a high-tension capacitor. The first and second circuit of the arrangement are inductively connected by way of a transformer. The relation between both the capacitors is approximately the inverse of the square of the tensions across said capacitors. The low-tension capacitors is proportioned thus, that its content of energy, regarding its operating tension corresponds to the ignition spark energy plus the losses occurring across the elements between this capacitor and the ignition spark gap. The capacity of the high-tension capacitor is proportioned for the tension resulting from the dimensions of the ignition spark gap and the condition of the gas in the discharge space. The natural frequencies of the first circuits may be low. However the natural frequency of the circuit within which the ignition spark gap lies, is larger than $10^7$ cycles per second. To guarantee the charging of the high-tension capacitor up to the desired tension, a series spark gap is provided, the insulation-resistance of which being independent from outer influences. The series spark gap for instance is arranged within a closed gas-filled chamber.

An exemplary embodiment of the invention is described in particular hereafter and shown in the accompanying drawing.

The illustrated arrangement consists of three series-connected circuits. The two first circuits of which being inductively coupled, whilst the second and third one which contains the ignition spark gap, are coupled galvanically. The first circuit contains the low or medium-tension capacitor 1, which is regularly charged over the lines 2 and 3. Furthermore the circuit contains the primary winding 4 of the ignition-transformer 5 and a closing contact 10, which is operated in dependence from the revolutions of the motor. The second circuit is formed by the secondary winding 8 of the transformer 5 and the high-tension capacitor 6. The third circuit of the arrangement contains also this capacitor 6 and the ignition spark gap 8 as well as a series ignition gap 9. With the actual construction the capacitor is situated immediately adjacent to the spark gaps 8 and 9.

Capacitor 1 is dimensioned such, that, with regard to the tension of the first circuit, its energy capacity is great enough to supply the energy provided for the ignition and also the losses of the following circuits.

According to the invention the sizes of the capacitors 1 and 6 are in a certain relation to one another, i.e. their energy contents must be approximately equal, considering their respectively occurring tensions. The discharging tension of capacitor 6 is settled by the break-down tension of the two series spark gaps 8 and 9 dependent on the condition of the gas. The task of the two first circuits is to transform the energy-capacity of capacitor, into the ignition spark energy stored up in capacitor 6, so that the last mentioned capacitor ensures an extremely quick and aperiodical energy conversion within the spark gaps.

Due to this the ignition arrangement according to the invention the influences of the capacitors and of soilings of the inner insulator are eliminated. Even when sprinkled with acidified water, the contrivance is operating reliably.

What we claim is:

1. Ignition contrivance for combustion engines comprising an ignition transformer, a first condenser for relatively low tension adapted to store the ignition energy, means for connecting said condenser to an electric power source to be continually charged therefrom, a first circuit connecting said condenser across the primary of said transformer, means for closing and opening said first circuit in synchronism with the operation of the engine to be ignited, a second condenser for relatively high tension, a second circuit connecting said second condenser across the secondary of said transformer, ignition spark gap means, and a third circuit connecting said spark gap means across said second condenser, each of said circuits having a natural frequency, whereby the circuit constants are related to result in the lowest natural frequency in said first circuit and the highest natural frequency in said third circuit.

2. The invention as claimed in claim 1 further characterized in that the natural frequency in said third circuit is higher than $10^7$ cycles per second.

3. The invention as claimed in claim 1 further characterized in that the circuit constants are chosen to obtain overdamped condition in each one of said three circuits.

4. The invention as claimed in claim 1, wherein an auxiliary spark gap means is interposed in said third circuit in series relationship with said ignition spark gap means across said second condenser.

5. Ignition contrivance for combustion engines comprising in combination an ignition transformer, a first condenser for relatively low tension adapted to store the ignition energy, means for connecting said condenser to an electric power source to be continually charged therefrom, a first circuit connecting said condenser across the primary of said transformer, means for closing and opening said first circuit in synchronism with the operation of the engine to be ignited, a second condenser for relatively high tension, a second circuit connecting said second condenser across the secondary of said transformer, spark gap means, and a third circuit connecting said spark gap means across said second condenser, the ratio between the capacitance of said first condenser and said second condenser being substantially inversely proportional to the ratio between the squares of the operating tensions of said condensers respectively.

References Cited in the file of this patent
UNITED STATES PATENTS

| | | |
|---|---|---|
| 1,296,006 | Press | Mar. 4, 1919 |
| 1,537,903 | Von Lepel | May 12, 1925 |
| 1,839,004 | Stewart | Dec. 29, 1931 |
| 2,276,966 | Hansell | Mar. 17, 1942 |
| 2,378,705 | Harmon et al. | June 19, 1945 |
| 2,443,060 | Wall | June 9, 1948 |
| 2,544,477 | West | Mar. 6, 1951 |
| 2,552,212 | Peroutky | May 8, 1951 |
| 2,571,789 | Tognola | Oct. 16, 1951 |
| 2,584,507 | Smits | Feb. 5, 1952 |
| 2,685,050 | Smits | July 27, 1954 |
| 2,814,659 | Smits | Nov. 26, 1957 |

FOREIGN PATENTS

| | | |
|---|---|---|
| 574,775 | Great Britain | Jan. 21, 1946 |